(12) United States Patent
Wu et al.

(10) Patent No.: US 12,270,380 B2
(45) Date of Patent: Apr. 8, 2025

(54) DATA-DRIVEN WIND FARM FREQUENCY CONTROL METHOD BASED ON DYNAMIC MODE DECOMPOSITION

(71) Applicant: TSINGHUA UNIVERSITY, Beijing (CN)

(72) Inventors: Wenchuan Wu, Beijing (CN); Zizhen Guo, Beijing (CN); Hongbin Sun, Beijing (CN); Bin Wang, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 873 days.

(21) Appl. No.: 17/446,653

(22) Filed: Sep. 1, 2021

(65) Prior Publication Data

US 2022/0195986 A1 Jun. 23, 2022

(30) Foreign Application Priority Data

Dec. 21, 2020 (CN) .......................... 202011521262.4

(51) Int. Cl.
*F03D 7/04* (2006.01)
*F03D 9/25* (2016.01)

(52) U.S. Cl.
CPC ............. *F03D 7/045* (2013.01); *F03D 7/048* (2013.01); *F03D 9/25* (2016.05); *F05B 2220/706* (2013.01); *F05B 2270/20* (2013.01); *H02J 2203/20* (2020.01)

(58) Field of Classification Search
CPC ...... F03D 7/048; F03D 7/045; H02J 2300/28; G06F 2113/06
See application file for complete search history.

(56) References Cited

U.S. PATENT DOCUMENTS

2015/0369214 A1* 12/2015 Herbsleb ................. F03D 7/022
416/61

OTHER PUBLICATIONS

Yang et al. Model Predictive Control-Based Load Frequency Control For Power Systems With Wind-Turbine Generators IET Renewable Power-Genration, Oct. 2019 (Year: 2019).*
S et al. A LSTM Based Wind Power Forecasting Method Considering Wind Frequency Components and the Wind Turbine States 22nd ICEMS (Year: 2019).*
Cassamo et al. On the Potential of Reduced ORder Models for Wind Farm Control: A Koopman Dynamic Mode Decomposition Approach Energies Dec. 10, 2020 (Year: 2020).*

* cited by examiner

*Primary Examiner* — Rehana Perveen
*Assistant Examiner* — Cuong V Luu
(74) *Attorney, Agent, or Firm* — Grossman, Tucker, Perreault & Pfleger, PLLC

(57) ABSTRACT

A data-driven wind farm frequency control method based on dynamic mode decomposition. The method enables a low-dimension nonlinear dynamic feature of a wind power system to perform global capturing in a high-dimension space through a state transition matrix given by a Koopman operator theory, thus fewer data samples are necessary while control requirements are satisfied with respect to a model fitting accuracy. Meanwhile, a pure linear feature of a control model also provides a favorable foundation for fast on-line dynamic response, thereby satisfying response accuracy and speed requirements simultaneously in an actual control step.

5 Claims, 2 Drawing Sheets

DATA-DRIVEN WIND FARM FREQUENCY CONTROL METHOD BASED ON DYNAMIC MODE DECOMPOSITION

FIELD OF TECHNOLOGY

The present invention belongs to the technical field of power and in particular, relates to a data-driven wind farm frequency control method based on dynamic mode decomposition.

BACKGROUND

Due to increasingly prominent environmental problems and energy crisis caused by fast consumption of conventional fossil energy, conventional energy demand of a power system is being gradually replaced by environment-friendly, efficient and sustainable clean energy, of which wind power has become an investment and construction focus worldwide as the most promising clean energy. With Europe as an example, installed capacity of wind power in Europe has increased at a rate of about 10 GW each year continuously in the recent 10 years. As of 2019, installed capacity of wind power in Europe reached 205 GW and wind power output reached as high as 15%, wherein domestic wind power output of Denmark reached as high as 48%. High wind power penetration rate brings a new challenge for operation control of a current grid and frequency stability of the grid is an important step thereof. With access of a large number of speed-variable wind turbines to the grid through power electronic converters, an active output and a frequency of a wind site present decoupling features of power electronic, resulting in reduction of overall equivalent inertia of a system and more serious frequency fluctuation of the grid under a same load disturbance, which are dangers for safe and stable operation of the grid. Therefore, the grid operation code of the world gradually uses capacity of the wind power for participation in frequency modulation as the precondition for grid entry. For example, Hydro-Quebec grid code of Canada requires that a wind farm having an installed capacity above 10 MW should be equipped with frequency correction control capacity. For China, the new Guide on Security and Stability for Power System prescribes that a wind power station and a photovoltaic power station of 35 kV and above should be equipped with a primary frequency modulation capability.

The technical solution for the current wind power to participate in the primary frequency modulation of the grid can be divided into a model-driven type and a data-driven type. With a model-driven control policy, a wind turbine dynamic model is built based on cognitive priors about a wind turbine energy transformation model. However, since a large number of device parameters in the site need to be measured and maintained regularly one by one, thus it is difficult to ensure accuracy and effectiveness of the model. As for a data-driven method, segmental linear fitting plays a major role currently. Methods of such type can build a dynamic model of a wind turbine through historical data. However, the segmental linear thinking pattern can not solve the nonlinear problem still of the wind turbine dynamic feature in different work conditions, as generally it is difficult for segmental number to balance conciseness and accuracy of the model. Therefore, it is necessary to study a wind turbine dynamic modeling and control method by combining model-driven and data-driven advantages, so as to adapt to actual requirements for fast and flexible participation of a wind site in grid frequency dynamic response.

SUMMARY

For the above problems, the present invention provides a data-driven wind farm frequency optimization control method based on dynamic mode decomposition. The optimization control method mainly consists of two modules: a wind turbine dynamic mode decomposition module and a wind farm frequency optimization control module. The specific steps of implementing optimization control comprises: measuring a wind turbine state in a wind farm at time t and transmitting it to a controller; performing wind turbine dynamic mode decomposition in the controller and calculation of an active frequency control instruction; and obtaining a control command at time t+1, thus transmitting it to the wind farm.

An object of the present invention for applying the optimization control method is a wind turbine generator system in a large wind site. Since the current investment and construction of a double-feed asynchronous wind turbine are of the largest scale, in an exemplary way, a control object is set as a double-feed asynchronous wind turbine. Meanwhile, wind turbines having similar operation situations and device parameters in the site can be aggregated into one unit for control.

For convenient statement, setting a local control step of the double-feed asynchronous wind turbine can enable an active output of an converter to be adjusted with an external active instruction. Meanwhile, rotation speed is locally controlled through a propeller pitch angle for constraint protection.

The data-driven wind farm frequency optimization control method based on dynamic mode decomposition specifically comprises the following steps:

S1: Building an Initial Data Set building a state equation of a power generation unit from a frequency modulation control perspective, as indicated by formula (1)

$$\omega_{k+1} = f(\omega_k, u_k) \quad (1)$$

wherein $\omega_k$ denotes a wind turbine rotation speed at time k, $f$ denotes a nonlinear state transition relation function and an input variable $u_k$ is defined as:

$$u_k = \begin{bmatrix} P_{ref,k} \\ v_{w,k} \end{bmatrix} \quad (2)$$

wherein, $P_{ref,k}$ is an active instruction of an external input and $v_{w,k}$ is a current wind speed. From a data driving perspective, a dynamic feature thereof should be restored according to historical data accumulated in a wind turbine operation process. However, such state transition relation is mainly comprised in a data pair having a timing sequence correspondence relation, which is denoted as:

$$X = [x_1 x_2 \ldots x_N], Y = [y_1 y_2 \ldots y_N] \quad (3)$$

wherein, $$\left( x_k = \begin{bmatrix} \omega_k \\ u_k \end{bmatrix}, y_k = \begin{bmatrix} \omega_{k+1} \\ u_{k+1} \end{bmatrix} \right)$$

is a data pair at time k, with N pairs in total, and wherein, $\omega_{k+1}$ and $u_{k+1}$ respectively denote a state quantity and an input quantity of a next step size. It should be noted that data matrices can be column-exchanged, as long as two matrices therebetween satisfy the column correspondence relation.

S2: Dynamic Mode Decomposition

A mode can be understood as an inherent element in a wind turbine dynamic feature. For a double-feed asynchronous wind turbine, an initiative nonlinear dynamic feature thereof comes from a wind energy transformation process described in a wind energy transformation equation.

$$p_m = \tfrac{1}{2}\rho A_{rot} c_p(\lambda,\theta) v_w^3 \qquad (4)$$

Wherein, $p_m$ is a mechanical power captured by a wind turbine blade; $\rho$ is an air density; $A_{rot}$ is an area of a wind-affected section decided by a radius of a wind turbine blade; and $c_p$ is a wind energy utilization rate of a wind turbine as a nonlinear function of a wind turbine tip speed ratio $$\lambda = \frac{\omega R}{v_\omega}$$

and a blade propeller pitch angle $\theta$, wherein, $\omega$ is a wind turbine rotation speed, R is a radius of a wind turbine blade and $v_w$ is a current wind speed. It can be seen from formula (4) that the wind energy transformation model enables presence of a strong nonlinear coupling relation between the state quantity and the input quantity of the wind turbine, which is a great challenge for solution of the optimization control problem. If a model-driven modeling policy is adopted, estimation or measurement of multiple parameters are certainly involved therein, resulting in the difficulty for ensuring control effects in a scene where the model is not complete. A dynamic mode decomposition thinking pattern involves mapping a low-dimension nonlinear dynamic process to a high-dimension observation space through an observation function based on cognitive priors about a wind turbine physical model, enabling a nonlinear dynamic feature of a low-dimension space to present a linear trend in a high-dimension space, such that a dynamic feature thereof is decomposed with a matrix linear algebra operation. The thinking pattern can not only perform a data-driven flexibility advantage, without abandoning a model-driven theoretical foundation, but also enable acquisition of an accurate dynamic mode with fewer samples.

Specifically, for state data $(\omega_k, u_k)$ at time k, an observation function $\Psi$ effects, thereby obtaining a high-dimension observation state vector:

$$\Psi(\omega_k, u_k) = \begin{bmatrix} \omega_k \\ \dfrac{1}{v_{\omega,k}} \\ e^{-0.1\omega_k v_{\omega,k}} \\ \omega_k^2 \\ u_k \end{bmatrix} = \begin{bmatrix} \psi(\omega_k, u_k) \\ u_k \end{bmatrix} \qquad (5)$$

It can be seen that a mapping-transformed vector and an initial state vector are maintained at a same dimensional number level. Thus, the operation does not add a burden of processing too much data. A mapping transformation effects for each column of an initial data set, thereby obtaining a high-dimension observation set matrix:

$$X_{lift} = [\Psi(\omega_1,u_1)\Psi(\omega_2,u_2) \ldots \Psi(\omega_N,u_N)]$$

$$Y_{lift} = [\Psi(\omega_2,u_2)\Psi(\omega_3,u_3) \ldots \Psi(\omega_{N+1},u_{N+1})] \qquad (6)$$

For trail data of a high-dimension observation space, a high-dimension linear dynamic feature of a wind turbine can be fitted through a state transition matrix value of limited dimensions according to related theories of a Koopman operator, that is, a search matrix A enables $\|Y_{lift} - A_{lift} X_{lift}\|_2$ to be minimum; and an optimization problem is solved and a wind turbine dynamic model is obtained through an algebra operation as follows:

$$A_{lift} = Y_{lift} X_{lift}^\dagger \qquad (7)$$

Wherein, $\dagger$ denotes a pseudo-inverse operation of a matrix. From a control perspective, it is also necessary to split a matrix $A_{lift}$ according to dimensional number of a high-dimension observation space and dimensional number of an input quantity; for a high-dimension mapping function structure employed by the method, a sub-block on a left upper side 4×4 of a matrix $A_{lift}$ is split as a state transition matrix A of a dynamic equation, and a sub-block on a right upper side 4×2 of a matrix $A_{lift}$ is split to obtain an input matrix B. By now, a wind turbine high-dimension linear dynamic model via dynamic mode decomposition can be represented as the following form:

$$\psi(\theta_{k+1}, u_{k+1}) = A\psi(\omega_k, u_k) + B u_k \qquad (8)$$

S3: A Central Wind Site Control Model

According to a dynamic mode decomposition method, a dynamic model of M power generation units in a wind site can be obtained.

$$\psi(\omega_{k+1}^i, u_{k+1}^i) = A_i \psi(\omega_k^i, u_k^i) + B_i u_k^i, \; i=1,2,\ldots,M \qquad (9)$$

on such a basis, a state vector in a central control model is defined as follows:

$$\chi_k = \begin{bmatrix} \psi(\omega_k^1, u_k^1) \\ \vdots \\ \psi(\omega_k^M, u_k^M) \end{bmatrix}_{4M \times 1} \qquad (10)$$

meanwhile, an input vector in a central control model is defined as follows:

$$\eta_k = \begin{bmatrix} u_k^1 \\ \vdots \\ u_k^M \end{bmatrix}_{2M \times 1} \qquad (11)$$

A control model corresponding to a central state vector is provided from formula (9):

$$\chi_{k+1} = A\chi_k + B\eta_k \qquad (12)$$

Wherein, a matrix A,B can be structured according to the following diagonal forms by a state transition matrix of each power generation unit:

$$A = \begin{bmatrix} A_1 & & \\ & \ddots & \\ & & A_M \end{bmatrix} \qquad (13)$$

-continued $$B = \begin{bmatrix} B_1 & & \\ & \ddots & \\ & & B_M \end{bmatrix} \quad (14)$$

Wherein, $A_1 \ldots A_M$ respectively denotes a state transition matrix of M power generation units, and $B_1 \ldots B_M$ respectively denotes an input matrix of M power generation units.

It can be seen that the matrix A,B structured in this manner is provided with a special sparsity structure, so as to provide more convenient conditions for fast solution of an on-line dynamic optimization control problem.

S4: On-Line Dynamic Optimization

On the basis of obtaining a wind turbine linear dynamic model through a data-driven method, a wind site dynamic optimization control algorithm can be represented as indicated by formula (15) according to a general form of a model prediction and control framework:

$$\min_{u_k, \chi_k} J((v_k)_{k=0}^{T-1}, (\chi_k)_{k=0}^{T}) \text{ subject to} \quad (15)$$

$$\chi_{k+1} = A\chi_k + Bv_k, k = 0, \ldots, T-1$$

$$E_k \chi_k + F_k v_k \le b_k, k = 0, \ldots, T-1$$

$$E_T \chi_T \le b_T$$

Wherein, T is a prediction range length of a model prediction and control algorithm and a target function J is shown in the following form:

$$J((v_k)_{k=0}^{T-1}, (\chi_k)_{k=0}^{T}) = \quad (16)$$

$$\chi_T^T Q_T \chi_T + q_T^T \chi_T + \sum_{k=0}^{T-1} \chi_k^T Q_k \chi_k + v_k^T R_k v_k + q_k^T \chi_k + r_k^T v_k$$

Wherein, $Q_k$, $Q_T$ is a positive semi-definite target coefficient matrix of a state variable at time k and time T, $R_k$ is a positive semi-definite target coefficient matrix of an input variable at time k, $q_k^\tau$, $q_T^\tau$ is a target coefficient vector of a state variable at time k and time T, $r_k^\tau$ is a target coefficient vector of an input variable at time k, $E_k$ is a state variable boundary constraint coefficient matrix at time k, $F_k$ is an input variable boundary constraint coefficient matrix at time k, and $b_k$ is a boundary constraint coefficient vector at time k. Design of a coefficient matrix and a coefficient vector depends on a wind site dynamic optimization control objective. $Q_k$, $R_k$ is a positive semi-definite coefficient matrix, a matrix $E_k$, $F_k$ and a vector $b_k$ correspond to a state quantity at time k and a boundary constraint of an input quantity respectively, $E_T$, $b_T$ is a boundary constraint of a state quantity at time T, and $\chi_T$ is a state quantity at time T. Design of a coefficient matrix and a coefficient vector depends on a wind site dynamic optimization control objective.

In the problem of frequency modulation for wind power, the control objective needs to be optimized in two aspects: wind farm active frequency modulation instruction's following effect and transient stability of a rotation speed of a power generation unit. Therefore, by using a fluctuation degree of a wind turbine rotation speed to measure its transient stability, the following optimization objective is given:

$$\min_{P_{ref}} \sum_{i=1}^{M} \left( \sum_{k=0}^{T-1} \|\Delta P_{ref,k}^i - K_{df}\Delta f\|_2 + Q_x \sum_{k=0}^{T-1} \|\omega_{k+1}^i - \omega_k^i\|_2 \right) \quad (17)$$

Wherein, an active adjusting amount $\Delta P_{ref,k}^i$ is defined as:

$$\Delta P_{ref,k}^i = P_{ref,k}^i - P_{MPPT,k}^i \quad (18)$$

formula (18) denotes an adjusting amount of a wind turbine active instruction $P_{ref,k}^i$ relative to a control instruction $P_{MPPT,k}^i$ provided by a local controller under a maximum power tracking model.

$$\Delta P_{ref,k}^i = P_{ref,k}^i - P_{deload,k}^i = P_{ref,k}^i - R_d \cdot P_{MPPT,k}^i \quad (19)$$

wherein, $P_{deload,k}^i$ is an active instruction of a load-reduction work mode and $R_d$ is a load-reduction amplitude coefficient; a frequency offset amount is defined as:

$$\Delta f = f_{meas} - f_{ref} \quad (20)$$

formula (20) denotes an offset amount of a grid entry point measurement frequency $f_{meas}$ relative to a reference frequency $f_{ref}$. A parameter $K_{df}$ is a droop coefficient of a wind farm in an external power-frequency feature curve and $Q_x$ is a weighting coefficient for balancing two optimization objectives. By adjusting an active instruction based on a local control instruction, a first item $$\sum_{i=1}^{M} \sum_{k=0}^{T-1} \|\Delta P_{ref,k}^i - K_{df}\Delta f\|_2$$

of an optimization objective in formula (17) enables allocation of a wind turbine frequency modulation task to be performed on the basis of considering a respective power generation level so as to enable an overall allocation of an active output to correspond to a wind turbine local working condition, such that a wind farm group also ensures overall wind energy transformation effects of the wind farm group while providing a frequency modulation service. By optimizing a fluctuation degree of a wind turbine rotation speed, a second item $$Q_x \sum_{i=1}^{M} \sum_{k=0}^{T-1} \|\omega_{k+1}^i - \omega_k^i\|_2$$

of an optimization objective enables a wind turbine operation state more stable, so as to reduce mechanical fatigue of a wind turbine which is caused by participation of the wind turbine in a frequency modulation response process, and is added to a gearbox and other fragile mechanical components, thereby prolonging the service life of the wind turbine.

On the basis of the optimization objective, a timing sequence constraint, a state quantity boundary constraint, an input constraint and an initial state constraint of a central state vector are provided and respectively indicated as formula (21), formula (22), formula (23) and formula (24):

$$\chi_{k+1} = A\chi_k + Bv_k, k=0,1,\ldots,T-1 \quad (21)$$

$$\omega_{min} \leq \omega_k^i = \psi(\omega_k^i, u_k^i)(1) \leq \omega_{max}, i=1,\ldots,M, \quad k=1,\ldots,T \qquad (22)$$

$$P_{ref,min} \leq u_k^i(1) \leq P_{ref,max}, \quad k=0,1,\ldots,T-1 \qquad (23)$$

$$\chi_0 = [\psi(\omega_0^1, u_0^1) \ldots \psi(\omega_0^M, u_0^M)]^\tau \qquad (24)$$

Wherein, $\chi_0$ denotes an initial state of a central state vector $\chi_k$, and formula (17) to formula (24) constitute a complete wind farm frequency dynamic optimization control method. Since both a constraint condition and a target function have concavity, thus the entire model constitutes a secondary planning problem belonging to convex optimization, which can be rapidly and accurately solved through the current optimization solution procedure.

The present invention provides a data-driven control method based on dynamic mode decomposition for dynamic frequency control of a high-rate wind power independent power system. The method enables a low-dimension nonlinear dynamic feature of a wind power system to perform global capturing in a high-dimension space through a state transition matrix provided by a Koopman operator theory, thus fewer data samples are necessary while control requirements are satisfied with respect to a model fitting accuracy. Meanwhile, a pure linear feature of a control model also provides a favorable foundation for fast on-line dynamic response, thereby satisfying response accuracy and speed requirements simultaneously in an actual control step.

Other features and advantages of the present invention will be stated in the subsequent description and partially become apparent from the description or will be understood by implementing the present invention. The purpose and other advantages of the present invention can be realized and obtained by a structure as pointed out in the description, claims and accompanying drawings.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and the person skilled in the art may still derive other drawings from these accompanying drawings without creative efforts.

DESCRIPTION OF THE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by the person skilled in the art based on the embodiments of the present invention without creative efforts fall within the protection scope of the present invention.

Figure 1:
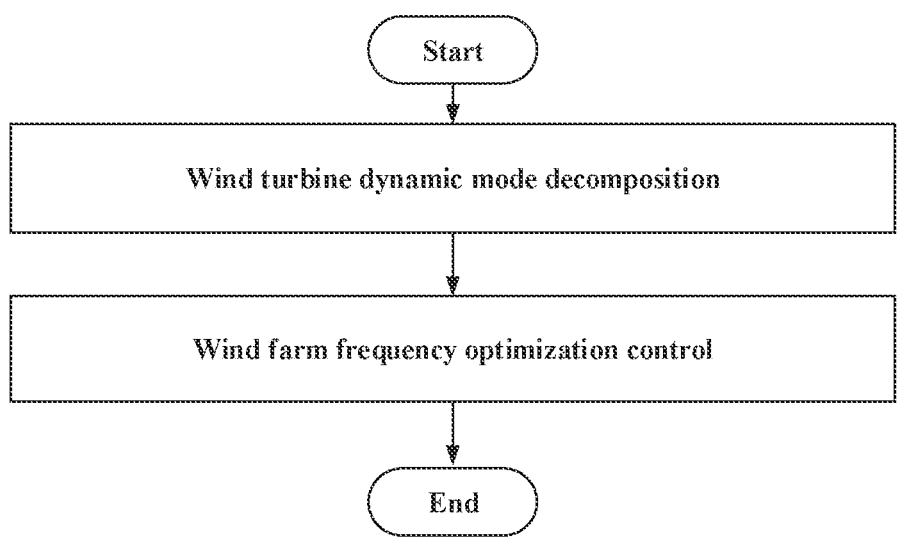
FIG. 1 shows a wind farm frequency optimization control module relation based on dynamic mode decomposition according to embodiments of the present invention.
Figure 2:
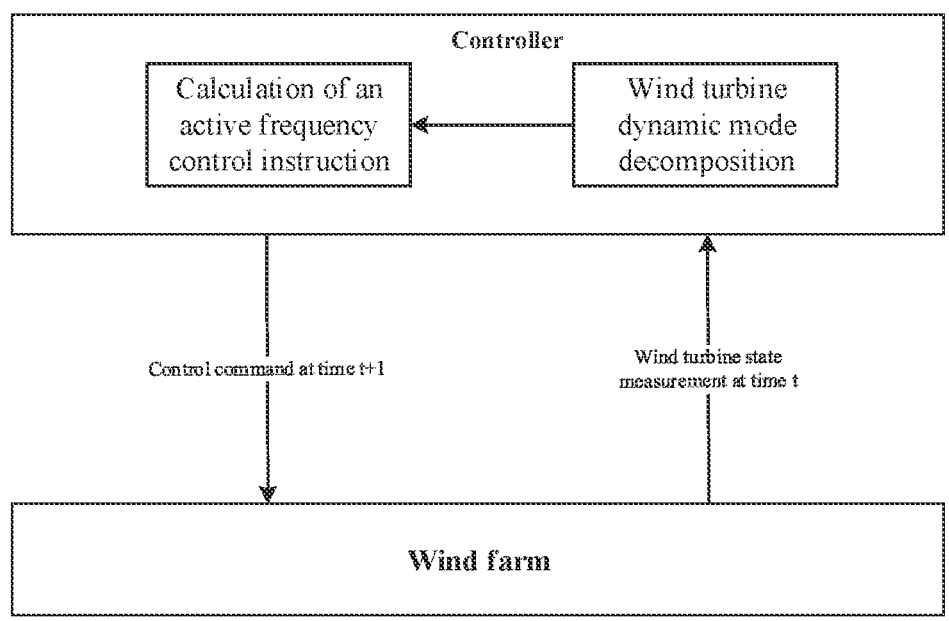
FIG. 2 shows implementation steps of wind farm frequency optimization control based on dynamic mode decomposition according to embodiments of the present invention.

The present invention provides a data-driven wind site frequency optimization control method based on dynamic mode decomposition. FIG. 1 shows a wind farm frequency optimization control module relation based on dynamic mode decomposition. It can be known from FIG. 1 that the optimization control method mainly consists of two modules: a wind turbine dynamic mode decomposition module and a wind farm frequency optimization control module. FIG. 2 shows implementation steps of wind farm frequency optimization control based on dynamic mode decomposition. It can be known from FIG. 2 that the implementation steps of optimization control comprises: measuring a wind turbine state in a wind farm at time t and transmitting it to a controller; performing wind turbine dynamic mode decomposition in the controller and calculation of an active frequency control instruction; and obtaining a control command at time t+1, thus transmitting it to the wind farm.

An object of the present invention for applying the optimization control method is a wind turbine generator system in a large wind site. Since the current investment and construction of a double-feed asynchronous wind turbine are of the largest scale, in an exemplary way, a control object is set as a double-feed asynchronous wind turbine. Meanwhile, wind turbines having similar operation situations and device parameters in the site can be aggregated into one unit for control.

For convenient statement, setting a local control step of the double-feed asynchronous wind turbine can enable an active output of an inverter to be adjusted with an external active instruction. Meanwhile, rotation speed is locally controlled through a propeller pitch angle for constraint protection.

The data-driven wind farm frequency optimization control method based on dynamic mode decomposition specifically comprises the following steps:

S1: Building an Initial Data Set building a state equation of a power generation unit from a frequency modulation control perspective, as indicated by formula (1)

$$\omega_{k+1} = f(\omega_k, u_k) \qquad (1)$$

wherein, $\omega_k$ denotes a wind turbine rotation speed at time k, $f$ denotes a nonlinear state transition relation function and an input variable $u_k$ is defined as:

$$u_k = \begin{bmatrix} P_{ref,k} \\ v_{\omega,k} \end{bmatrix} \qquad (2)$$

wherein, $P_{ref,k}$ is an active instruction of an external input and $v_{w,k}$ is a current wind speed; From a data driving perspective, a dynamic feature thereof should be restored according to historical data accumulated in a wind turbine operation process. However, such state transition relation is mainly comprised in a data pair having a timing sequence correspondence relation, which is denoted as:

$$X = [x_1 x_2 \ldots x_N], Y = [y_1 y_2 \ldots y_N] \qquad (3)$$

wherein, $$\left( x_k = \begin{bmatrix} \omega_k \\ u_k \end{bmatrix}, y_k = \begin{bmatrix} \omega_{k+1} \\ u_{k+1} \end{bmatrix} \right)$$

is a data pair at time k, with N pairs in total, and wherein $\omega_{k+1}$ and $u_{k+1}$ respectively denote a state quantity and an input quantity of a next step size. It should be noted that a data matrix can be column-exchanged, as long as two matrices therebetween satisfy the column correspondence relation.

S2: Dynamic Mode Decomposition

A mode can be understood as an inherent element in a wind turbine dynamic feature. For a double-feed asynchronous wind turbine, an initiative nonlinear dynamic feature thereof comes from a wind energy transformation process described in a wind energy transformation equation.

$$p_m = \tfrac{1}{2} \rho A_{rot} c_p(\lambda,\theta) v_w^3 \qquad (4)$$

Wherein, $p_m$ is a mechanical power captured by a wind turbine blade; $\rho$ is an air density; $A_{rot}$ is an area of a wind-affected section decided by a radius of a wind turbine blade; and $c_p$ is a wind energy utilization rate of a wind turbine as a nonlinear function of a wind turbine tip speed ratio $$\lambda = \frac{\omega R}{v_\omega}$$

and a blade propeller pitch angle $\theta$, wherein $\omega$ is a wind turbine rotation speed, R is a radius of a wind turbine blade and $v_w$ is a current wind speed. It can be seen from formula (4) that the wind energy transformation model enables presence of a strong nonlinear coupling relation between the state quantity and the input quantity of the wind turbine, which is a great challenge for solution of the optimization control problem. If a model-driven modeling policy is adopted, estimation or measurement of multiple parameters are certainly involved therein, resulting in difficulty for ensuring control effects in a scene where the model is not complete. A dynamic mode decomposition thinking pattern involves mapping a low-dimension nonlinear dynamic process to a high-dimension observation space through an observation function based on cognitive priors about a wind turbine physical model, enabling a nonlinear dynamic feature of a low-dimension space to present a linear trend in a high-dimension space, such that a dynamic feature thereof is decomposed with a matrix linear algebra operation. The thinking pattern can not only perform a data-driven flexibility advantage, without abandoning a model-driven theoretical foundation, but also enable acquisition of an accurate dynamic mode with fewer samples.

Specifically, for state data $(\omega_k, u_k)$ at time k, an observation function $\Psi$ effects, thereby obtaining a high-dimension observation state vector:

$$\Psi(\omega_k, u_k) = \begin{bmatrix} \omega_k \\ \dfrac{1}{v_{\omega,k}} \\ e^{-0.1\omega_k v_{\omega,k}} \\ \omega_k^2 \\ u_k \end{bmatrix} = \begin{bmatrix} \psi(\omega_k, u_k) \\ u_k \end{bmatrix} \qquad (5)$$

It can be seen that a mapping-transformed vector and an initial state vector are maintained at a same dimensional number level. Thus, the operation does not add a burden of processing too much data. A mapping transformation effects for each column of an initial data set, thereby obtaining a high-dimension observation set matrix:

$$X_{lift} = [\Psi(\omega_1, u_1) \Psi(\omega_2, u_2) \ldots \Psi(\omega_N, u_N)]$$

$$Y_{lift} = [\Psi(\omega_2, u_2) \Psi(\omega_3, u_3) \ldots \Psi(\omega_{N+1}, u_{N+1})] \qquad (6)$$

For trail data of a high-dimension observation space, a high-dimension linear dynamic feature of a wind turbine can be fitted through a state transition matrix value of limited dimensions according to related theories of a Koopman operator, that is, a search matrix $A_{lift}$ enables $\|Y_{lift} - A_{lift} X_{lift}\|_2$ to be minimum; and an optimization problem is solved and a wind turbine dynamic model is obtained through an algebra operation as follows:

$$A_{lift} = Y_{lift} X_{lift}^\dagger \qquad (7)$$

Wherein, † denotes a pseudo-inverse operation of a matrix. From a control perspective, it is also necessary to split a matrix $A_{lift}$ according to dimensional number of a high-dimension observation space and dimensional number of an input quantity; for a high-dimension mapping function structure employed by the method, a sub-block on a left upper side 4×4 of a matrix $A_{lift}$ is split as a state transition matrix A of a dynamic equation, and a sub-block on a right upper side 4×2 of a matrix $A_{lift}$ is split to obtain an input matrix B. By now, a wind turbine high-dimension linear dynamic model via dynamic mode decomposition can be represented as the following form:

$$\psi(\theta_{k+1}, u_{k+1}) = A\psi(\omega_k, u_k) + Bu_k \qquad (8)$$

S3: A Central Wind Site Control Model

According to a dynamic mode decomposition method, a dynamic model of M power generation units in a wind site can be obtained.

$$\psi(\omega_{k+1}^i, u_{k+1}^i) = A_i \psi(\omega_k^i, u_k^i) + B_i u_k^i, \; i=1,2,\ldots,M \qquad (9)$$

on such a basis, a state vector in a central control model is defined as follows:

$$\chi_k = \begin{bmatrix} \psi(\omega_k^1, u_k^1) \\ \vdots \\ \psi(\omega_k^M, u_k^M) \end{bmatrix}_{4M \times 1} \qquad (10)$$

meanwhile, an input vector in a central control model is defined as follows:

$$\eta_k = \begin{bmatrix} u_k^1 \\ \vdots \\ u_k^M \end{bmatrix}_{2M \times 1} \qquad (11)$$

A control model corresponding to a central state vector is provided from formula (9):

$$\chi_{k+1} = A\chi_k + B\eta_k \qquad (12)$$

Wherein, a matrix A,B can be structured according to the following diagonal forms by a state transition matrix of each power generation unit:

$$A = \begin{bmatrix} A_1 & & \\ & \ddots & \\ & & A_M \end{bmatrix} \qquad (13)$$

-continued $$B = \begin{bmatrix} B_1 & & \\ & \ddots & \\ & & B_M \end{bmatrix} \quad (14)$$

Wherein, $A_1 \ldots A_M$ respectively denotes a state transition matrix of M power generation units, and $B_1 \ldots B_M$ respectively denotes an input matrix of M power generation units.

It can be seen that the matrix A,B structured in this manner is provided with a special sparsity structure, so as to provide more convenient conditions for fast solution of an on-line dynamic optimization control problem.

S4: On-Line Dynamic Optimization

On the basis of obtaining a wind turbine linear dynamic model through a data-driven method, a wind farm dynamic optimization control algorithm can be represented as indicated by formula (15) according to a general form of a model prediction and control framework:

$$\min_{u_k, \chi_k} J((v_k)_{k=0}^{T-1}, (\chi_k)_{k=0}^{T}) \quad (15)$$

$$\text{subject to } \chi_{k+1} = A\chi_k + Bv_k, k = 0, \ldots, T-1$$

$$E_k \chi_k + F_k v_k \leq b_i, k = 0, \ldots, T-1$$

$$E_T \chi_T \leq b_T$$

Wherein, is a prediction range length of a model prediction and control algorithm and a target function is shown in the following form:

$$J((v_k)_{k=0}^{T-1}, (\chi_k)_{k=0}^{T}) = \quad (16)$$

$$\chi_T^\top Q_T \chi_T + q_T^\top \chi_T + \sum_{k=0}^{T-1} \chi_k^\top Q_k \chi_k + v_k^\top R_k v_k + q_k^\top \chi_k + r_k^\top v_k$$

Wherein, $Q_k$, $Q_T$ is a positive semi-definite target coefficient matrix of a state variable at time k and time T, $R_k$ is a positive semi-definite target coefficient matrix of an input variable at time $q_k^T$, $q_T^\tau$ is a target coefficient vector of a state variable at time k and time T, $r_k^\tau$ is a target coefficient vector of an input variable at time k, $E_k$ is a state variable boundary constraint coefficient matrix at time k, $F_k$ is an input variable boundary constraint coefficient matrix at time k, and $b_k$ is a boundary constraint coefficient vector at time k. Design of a coefficient matrix and a coefficient vector depends on a wind site dynamic optimization control objective. $Q_k$, $R_k$ is a positive semi-definite coefficient matrix, a matrix $E_k$, $F_k$ and a vector $b_k$ correspond to a state quantity at time k and a boundary constraint of an input quantity respectively, $E_T$, $b_T$ is a boundary constraint of a state quantity at time T, and $\chi_T$ is a state quantity at time T. Design of a coefficient matrix and a coefficient vector depends on a wind site dynamic optimization control objective.

In the problem of frequency modulation for wind power, the control objective needs to be optimized in two aspects: wind farm active frequency modulation instruction's following effect and transient stability of a rotation speed of a power generation unit. Therefore, by using a fluctuation degree of a wind turbine rotation speed to measure its transient stability, the following optimization objective is given:

$$\min_{P_{ref}^i} \sum_{i=1}^{M} \left( \sum_{k=0}^{T-1} \|\Delta P_{ref,k}^i - K_{df}\Delta f\|_2 + Q_x \sum_{k=0}^{T-1} \|\omega_{k+1}^i - \omega_k^i\|_2 \right) \quad (17)$$

Wherein, an active adjusting amount $\Delta P_{ref,k}^i$ is defined as:

$$\Delta P_{ref,k}^i = P_{ref,k}^i - P_{MPPT,k}^i \quad (18)$$

formula (18) denotes an adjusting amount of a wind turbine active instruction $P_{ref,k}^i$ relative to a control instruction $P_{MPPT,k}^i$ provided by a local controller under a maximum power tracking model.

$$\Delta P_{ref,k}^i = P_{ref,k}^i - P_{deload,k}^i = P_{ref,k}^i - R_d \cdot P_{MPPT,k}^i \quad (19)$$

wherein, $P_{deload,k}^i$ is an active instruction of a load-reduction work mode and $R_d$ is a load-reduction amplitude coefficient; a frequency offset amount is defined as:

$$\Delta f = f_{meas} - f_{ref} \quad (20)$$

formula (20) denotes an offset amount of a grid entry point measurement frequency $f_{meas}$ relative to a reference frequency $f_{ref}$. A parameter $K_{df}$ is a droop coefficient of a wind farm in an external power-frequency feature curve and Q is a weighting coefficient for balancing two optimization objectives. By adjusting an active instruction based on a local control instruction, a first item $$\sum_{i=1}^{M} \sum_{k=0}^{T-1} \|\Delta P_{ref,k}^i - K_{df}\Delta f\|_2$$

of an optimization objective in formula (17) enables allocation of a wind turbine frequency modulation task to be performed on the basis of considering a respective power generation level so as to enable an overall allocation of an active output to correspond to a wind turbine local working condition, such that a wind farm group also ensures overall wind energy transformation effects of the wind farm group while providing a frequency modulation service. By optimizing a fluctuation degree of a wind turbine rotation speed, a second item $$Q_x \sum_{i=1}^{M} \sum_{k=0}^{T-1} \|\omega_{k+1}^i - \omega_k^i\|_2$$

of an optimization objective enables a wind turbine operation state more stable, so as to reduce mechanical fatigue of a wind turbine which is caused by participation of the wind turbine in a frequency modulation response process, and is added to a gearbox and other fragile mechanical components, thereby prolonging the service life of the wind turbine.

On the basis of the optimization objective, a timing sequence constraint, a state boundary constraint, an input boundary constraint and an initial state constraint of a central state vector are provided and respectively indicated as formula (21), formula (22), formula (23) and formula (24):

$$\chi_{k+1} = A\chi_k + Bv_k, k=0,1,\ldots,T-1 \quad (21)$$

$$\omega_{min} \leq \omega_k^i = \psi(\omega_k^i, u_k^i)(1) \leq \omega_{max}, \, i=1,\ldots, M, k=1,\ldots,T \quad (22)$$

$$P_{ref,min} \leq u_k^i(1) \leq P_{ref,max}, \, k=0,1,\ldots,T-1 \quad (23)$$

$$\chi_0 = [\psi(\omega_0^1, u_0^1) \ldots \psi(\omega_0^M, u_0^M)]^\tau \quad (24)$$

Wherein, $\chi_0$ denotes an initial state of a central state vector $\chi_k$, and formula (17) to formula (24) constitute a complete wind site frequency dynamic optimization control method. Since both a constraint condition and a target function have concavity, thus the entire model constitutes a secondary planning problem belonging to convex optimization, which can be rapidly and accurately solved through the current optimization solution procedure.

The present invention provides a data-driven control method based on dynamic mode decomposition for dynamic frequency control of a high-rate wind power independent power system. The method enables a low-dimension nonlinear dynamic feature of a wind power system to perform global capturing in a high-dimension space through a state transition matrix given by a Koopman operator theory, thus fewer data samples are necessary while control requirements are satisfied with respect to a model fitting accuracy. Meanwhile, a pure linear feature of a control model also provides a favorable foundation for fast on-line dynamic response, thereby satisfying response accuracy and speed requirements simultaneously in an actual control step.

Although the present invention is described in detail with reference to the foregoing embodiments, the person skilled in the art should understand that they may still make modifications to the technical solutions described in the foregoing embodiments or make equivalent replacements to some technical features thereof. These modifications or replacements do not enable the essence of the corresponding technical solutions to depart from the spirit and scope of the technical solutions of the embodiments of the present invention.

What is claimed is:

1. A data-driven wind farm frequency control method based on dynamic mode decomposition, wherein the method comprises the following steps:
   S1: building a state equation of a power generation unit in a wind farm;
   S2: mapping state data in the state equation to a high-dimension observation state vector through an observation function, thereby obtaining a wind turbine high-dimension linear dynamic model through a matrix algebra operation;
   S3: according to a dynamic mode decomposition method in the step S2, obtaining a dynamic model of the power generation unit in a wind site; and further defining a state vector in a central control model while defining a wind speed of the power generation unit and an input vector of an active instruction, thereby obtaining a central wind farm control model;
   S4: according to a wind farm active frequency modulation instruction and a wind turbine rotation speed fluctuation degree, designing a control optimization objective; and obtaining a constraint condition of a central state vector based on the optimization objective, thus building a complete wind farm frequency dynamic optimization control method;
   S5: providing, by a controller, a control command to the wind farm based on the control optimization objective determined by the controller; and
   S6: controlling an output frequency of the wind farm in response to the control command, wherein the state equation of the power generation unit in the step S1 is indicated by formula (1):

$$\omega_{k+1} = f(\omega_k, u_k) \quad (1)$$

Wherein, $\omega_k$ denotes a wind turbine rotation speed at time k, $f$ denotes a nonlinear state transition relation function and an input variable $u_k$ is defined as $$u_k = \begin{bmatrix} P_{ref,k} \\ v_{w,k} \end{bmatrix} \quad (2)$$

Wherein, $P_{ref,k}$ is an active instruction of an external input and $v_{w,k}$ is a current wind speed;

a state transition relation of the power generation unit is mainly comprised in a data pair having a timing sequence correspondence relation, which is denoted as:

$$X = [x_1 x_2 \ldots x_N], \, Y = [y_1 y_2 \ldots y_N] \quad (3)$$

wherein $$\left( x_k = \begin{bmatrix} \omega_k \\ u_k \end{bmatrix}, \, y_k = \begin{bmatrix} \omega_{k+1} \\ u_{k+1} \end{bmatrix} \right)$$

is a data pair at time k, with N pairs in total.

2. A data-driven wind farm frequency control method based on dynamic mode decomposition, wherein the method comprises the following steps:
   S1: building a state equation of a power generation unit in a wind farm;
   S2: mapping state data in the state equation to a high-dimension observation state vector through an observation function, thereby obtaining a wind turbine high-dimension linear dynamic model through a matrix algebra operation;
   S3: according to a dynamic mode decomposition method in the step S2, obtaining a dynamic model of the power generation unit in a wind site; and further defining a state vector in a central control model while defining a wind speed of the power generation unit and an input vector of an active instruction, thereby obtaining a central wind farm control model;
   S4: according to a wind farm active frequency modulation instruction and a wind turbine rotation speed fluctuation degree, designing a control optimization objective; and obtaining a constraint condition of a central state vector based on the optimization objective, thus building a complete wind farm frequency dynamic optimization control method;
   S5: providing, by a controller, a control command to the wind farm based on the control optimization objective determined by the controller; and
   S6: controlling an output frequency of the wind farm in response to the control command, wherein in the step S2, for state data ($\omega_k$, $u_k$) at time k, an observation function $\Psi$ effects, thereby obtaining a high-dimension observation state vector;

$$\Psi(\omega_k, u_k) = \begin{bmatrix} \omega_k \\ \frac{1}{v_{\omega,k}} \\ e^{-0.1\omega_k v_{\omega,k}} \\ \omega_k^2 \\ u_k \end{bmatrix} = \begin{bmatrix} \psi(\omega_k, u_k) \\ u_k \end{bmatrix} \quad (4)$$

a mapping transformation effects for each column of an initial data set, thereby obtaining a high-dimension observation set matrix:

$$X_{lift} = [\Psi(\psi_1, u_1)\Psi(\omega_2, u_2) \ldots \Psi(\omega_N, u_N)]$$

$$Y_{lift} = [\Psi(\psi_2, u_1)\Psi(\omega_3, u_3) \ldots \Psi(\omega_{N+1}, u_{N+1})] \quad (5)$$

for trail data of a high-dimentsion observation space, a search matrix $A_{lift}$ enables $\|Y_{lift} - A_{lift} X_{lift}\|_2$ to be minimum; and an optimization problem is solved through an algebra operation indicated by formula (6):

$$A_{lift} = Y_{lift} X_{lift}^{\dagger}$$

Wherein, † denotes a pseudo-inverse operation of a matrix; from a control perspective, a matrix $A_{lift}$ is split according to dimension number of a high-dimension observation space and dimensional number of an input quantity; for a high-dimension mapping function structure employed by the method, a sub-block on a left upper side 4×4 of a matrix $A_{lift}$ is split as a state transition matrix A of a dynamic equation, and a sub-block on a right upper side 4×2 of a matrix $A_{lift}$ is split to obtain an input matrix B; and a wind turbine high-dimension linear dynamic model is obtained as indication by formula (7):

$$\psi(\psi_{k+1}, u_{k+1}) = A\psi(\omega_k, u_k) + Bu_k \quad (7).$$

3. A data-driven wind farm frequency control method based on dynamic mode decomposition, wherein the method comprises the following steps:
S1: building a state equation of a power generation unit in a wind farm;
S2: mapping state data in the state equation to a high-dimension observation state vector through an observation function, thereby obtaining a wind turbine high-dimension linear dynamic model through a matrix algebra operation;
S3: according to a dynamic mode decomposition method in the step S2, obtaining a dynamic model of the power generation unit in a wind site; and further defining a state vector in a central control model while defining a wind speed of the power generation unit and an input vector of an active instruction, thereby obtaining a central wind farm control model;
S4: according to a wind farm active frequency modulation instruction and a wind turbine rotation speed fluctuation degree, designing a control optimization objective; and obtaining a constraint condition of a central state vector based on the optimization objective, thus building a complete wind farm frequency dynamic optimization control method;
S5: providing, by a controller, a control command to the wind farm based on the control optimization objective determined by the controller; and
S6: controlling an output frequency of the wind farm in response to the control command, wherein in the step S3, the dynamic model of M power generation units in the wind site is indicated by formula (8):

$$\psi(\theta_{k+1}^i, u_{k+1}^i) = A_i \psi(\omega_k^i, u_k^i) + B_i u_k^i, \ i=1,2,\ldots,M \quad (8)$$

on such a basis, a state vector in a central control model is defined as indicated by formula (9):

$$\chi_k = \begin{bmatrix} \psi(\omega_k^1, u_k^1) \\ \vdots \\ \psi(\omega_k^M, u_k^M) \end{bmatrix}_{4M \times 1} \quad (9)$$

meanwhile, an input vector in a central control model is defined as indicated by formula (10):

$$\eta_k = \begin{bmatrix} u_k^1 \\ \vdots \\ u_k^M \end{bmatrix}_{2M \times 1} \quad (10)$$

a control model corresponding to a central state vector is provided from formula (8):

$$\chi_{k+1} = A\chi_k + B\eta_k \quad (11)$$

Wherein, a matrix A, B is respectively structured according to diagonal forms of formula (12) and formula (13) by a state transition matrix of each power generation unit:

$$A = \begin{bmatrix} A_1 & & \\ & \ddots & \\ & & A_M \end{bmatrix} \quad (12)$$

$$B = \begin{bmatrix} B_1 & & \\ & \ddots & \\ & & B_M \end{bmatrix} \quad (13)$$

Wherein, $A_1 \ldots A_M$ respectively denotes a state transition matrix of M power generation units, and $B_1 \ldots B_M$ respectively denotes an input matrix of M power generation units.

4. A data-driven wind farm frequency control method based on dynamic mode decomposition, wherein the method comprises the following steps:
S1: building a state equation of a power generation unit in a wind farm;
S2: mapping state data in the state equation to a high-dimension observation state vector through an observation function, thereby obtaining a wind turbine high-dimension linear dynamic model through a matrix algebra operation;
S3: according to a dynamic mode decomposition method in the step S2, obtaining a dynamic model of the power generation unit in a wind site; and further defining a state vector in a central control model while defining a wind speed of the power generation unit and an input vector of an active instruction, thereby obtaining a central wind farm control model;
S4: according to a wind farm active frequency modulation instruction and a wind turbine rotation speed fluctuation degree, designing a control optimization objective; and obtaining a constraint condition of a central state vector based on the optimization objective, thus building a complete wind farm frequency dynamic optimization control method;

S5: providing, by a controller, a control command to the wind farm based on the control optimization objective determined by the controller; and S6: controlling an output frequency of the wind farm in response to the control command, wherein in the step S4, the optimization objective is indicated by formula (14):

$$\min_{P_{ref}} \sum_{i=1}^{M} \left( \sum_{k=0}^{T-1} \|\Delta P_{ref,k}^i - K_{df}\Delta f\|_2 + Q_x \sum_{k=0}^{T-1} \|\omega_{k+1}^i - \omega_k^i\|_2 \right) \quad (14)$$

$$\Delta P_{ref,k}^i = P_{ref,k}^i - P_{ref,k}^i = P_{MPPT,k}^i \quad (15)$$

formula (15) denotes an adjusting amount of a wind turbine active instruction $P_{ref,k}^i$ relative to a control instruction $P_{MPPT,k}^i$ provided by a local controller under a maximum power tracking model, a parameter $K_{df}$ is a droop coefficient of a wind farm in an external power-frequency feature curve, $\Delta f$ is a frequency offset amount and $Q_x$ is a weighting coefficient for balancing two optimization objectives;

if a current wind farm adopts a load-reduction work mode, a corresponding active adjusting reference changes into:

$$\Delta P_{ref,k}^i = P_{ref,k}^i - P_{deload,k}^i = P_{ref,k}^i = R_d \cdot P_{MPPT,k}^i \quad (16)$$

Wherein, $P_{deload,k}^i$ is an active instruction of a load-reduction work mode and $R_d$ is a load-reduction amplitude coefficient;

a frequence offset amount is defined as:

$$\Delta f = f_{meas} - f_{ref} \quad (17)$$

formula (17) denotes an offset amount of a grid entry point measurement frequency $f_{meas}$ relative to a reference frequency $f_{ref}$.

5. A data-driven wind farm frequency control method based on dynamic mode decomposition, wherein the method comprises the following steps:

S1: building a state equation of a power generation unit in a wind farm;

S2: mapping state data in the state equation to a high-dimension observation state vector through an observation function, thereby obtaining a wind turbine high-dimension linear dynamic model through a matrix algebra operation;

S3: according to a dynamic mode decomposition method in the step S2, obtaining a dynamic model of the power generation unit in a wind site; and further defining a state vector in a central control model while defining a wind speed of the power generation unit and an input vector of an active instruction, thereby obtaining a central wind farm control model;

S4: according to a wind farm active frequency modulation instruction and a wind turbine rotation speed fluctuation degree, designing a control optimization objective; and obtaining a constraint condition of a central state vector based on the optimization objective, thus building a complete wind farm frequency dynamic optimization control method;

S5: providing, by a controller, a control command to the wind farm based on the control optimization objective determined by the controller; and S6: controlling an output frequency of the wind farm in response to the control command, wherein in the step S4, the constraint condition of the central state vector is a timing sequence constraint, a state boundary constraint, an input constraint and an initial state constraint, which are respectively indicated as formula (18, formula (19), formula (20) and formula (21):

$$\chi_{k+1} = A\chi_k + B v_k,\ k=0,1,\ldots,T-1 \quad (18)$$

$$\omega_{min} \le \omega_k^i = \psi(\omega_k^i, u_k^i)(1) \le \omega_{max},\ i=1,\ldots,M,\ k=1,\ldots,T \quad (19)$$

$$P_{ref,min} \le u_k^i(1) \le P_{ref,max},\ k=0,1,\ldots,T-1 \quad (20)$$

$$\chi_0 = [\psi(\omega_0^1, u_0^1) \ldots \psi(\omega_0^M, u_0^M)]^\tau \quad (21)$$

Wherein, $\chi_0$ denotes an initial state of a central state vector $\chi_k$, and formula (14) to formula (21) constitute a complete wind farm frequency dynamic optimization control method.

* * * * *